(12) United States Patent
Leone et al.

(10) Patent No.: US 8,960,133 B2
(45) Date of Patent: Feb. 24, 2015

(54) LIQUID INJECTION FOR SCAVENGING

(71) Applicant: Ford Global Technologies, LLC, Dearborn, MI (US)

(72) Inventors: Thomas G. Leone, Ypsilanti, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 13/748,452

(22) Filed: Jan. 23, 2013

(65) Prior Publication Data

US 2014/0202434 A1    Jul. 24, 2014

(51) Int. Cl.
| F02M 25/00 | (2006.01) |
| F01L 1/34 | (2006.01) |
| F02B 47/02 | (2006.01) |
| F02B 47/08 | (2006.01) |

(52) U.S. Cl.
CPC ..................... *F02B 47/08* (2013.01)
USPC ............. 123/25 H; 123/90.15; 123/568.14; 123/198 A; 123/1 A; 123/25 G; 123/25 C

(58) Field of Classification Search
CPC ........... F02B 47/00; F02B 47/02; F02B 47/04
USPC ............. 123/568.11, 568.12, 568.15, 568.14, 123/25 A–25 H, 25 R, 64, 198 A, 299, 305, 123/406.33–36, 406.45, 1 A, 41.17, 698, 123/90.15, 27 GE; 60/601
See application file for complete search history.

(56) References Cited

U.S. PATENT DOCUMENTS

| 3,672,341 | A | * | 6/1972 | Smith et al. | .................... | 123/536 |
| 3,696,795 | A | * | 10/1972 | Smith et al. | .................... | 123/1 A |
| 4,558,665 | A | * | 12/1985 | Sandberg et al. | ........... | 123/25 C |
| 4,757,787 | A | * | 7/1988 | Risitano et al. | ............. | 123/25 A |
| 5,832,880 | A | * | 11/1998 | Dickey | ........................ | 123/25 C |
| 6,289,853 | B1 | * | 9/2001 | Walczak et al. | ............. | 123/25 R |
| 7,424,881 | B2 | | 9/2008 | Kerns | | |
| 7,454,285 | B2 | | 11/2008 | Christie et al. | | |
| 7,730,872 | B2 | | 6/2010 | Leone et al. | | |
| 7,827,960 | B2 | | 11/2010 | Kawakita et al. | | |
| 8,082,735 | B2 | | 12/2011 | Bromberg et al. | | |
| 8,096,283 | B2 | | 1/2012 | Surnilla et al. | | |
| 8,352,162 | B2 | | 1/2013 | Leone et al. | | |
| 8,483,937 | B2 | | 7/2013 | Surnilla et al. | | |
| 2007/0119391 | A1 | * | 5/2007 | Fried et al. | .................. | 123/25 A |
| 2007/0119392 | A1 | * | 5/2007 | Leone et al. | ................ | 123/25 C |
| 2008/0000445 | A1 | * | 1/2008 | Kim et al. | ...................... | 123/295 |
| 2008/0072881 | A1 | * | 3/2008 | Leone et al. | .................. | 123/516 |
| 2010/0121559 | A1 | * | 5/2010 | Bromberg et al. | ............ | 701/111 |
| 2010/0313831 | A1 | | 12/2010 | Szybist et al. | | |
| 2011/0174263 | A1 | * | 7/2011 | Leone et al. | .................... | 123/25 |
| 2011/0247584 | A1 | * | 10/2011 | Gentile | ........................... | 123/25 |

* cited by examiner

*Primary Examiner* — Lindsay Low
*Assistant Examiner* — George Jin
(74) *Attorney, Agent, or Firm* — Julia Voutyras; Alleman Hall McCoy Russell & Tuttle LLP

(57) ABSTRACT

Methods are provided for controlling an engine. One method may include boosting engine intake air to a cylinder; and injecting an amount of a scavenging fluid into the cylinder based on an amount of cylinder residual exhaust gas. A scavenging fluid, such as water or windshield washer fluid evaporates on contact with the hot exhaust gases and hot metal components and the expanded volume of the vapor displaces the residual exhaust gas, thereby improving engine scavenging.

21 Claims, 5 Drawing Sheets

LIQUID INJECTION FOR SCAVENGING

TECHNICAL FIELD

The present application relates to exhaust scavenging for internal combustion engines.

BACKGROUND AND SUMMARY

Exhaust scavenging in internal combustion engines is used to clear hot exhaust products from a combustion cylinder and recharge the cylinder with fresh intake air. Scavenging allows fresh air to flush out most of the residual hot exhaust gas from the clearance volume, and the resulting decrease in temperature reduces knock tendency, thus allowing greater spark advance which increases torque. Furthermore, the reduction in the amount of residual exhaust gas leaves more room for fresh air-fuel mixture which further increases torque. Scavenging is commonly used in the European market, but most turbocharged engines sold in the US market are calibrated to use much less scavenging, due to emissions concerns.

Traditional scavenging, or "blow through", of fresh air is used when the intake manifold pressure is higher than exhaust manifold pressure. This is typical of turbocharged engines up to approximately 2000-2500 RPM. Turbocharged engines with tiVCT (Twin Independent Variable Camshaft Timing) can achieve low speed knock and torque benefits using scavenging. However, traditional scavenging can result in oxygenated fresh air passing through the exhaust valve and on to the exhaust aftertreatment system, resulting in increased emissions. The excess of oxygen in the exhaust is, in part, due to air flow used for traditional exhaust scavenging flowing through the exhaust valve during valve overlap. In some instances, this overlap allows intake air directly into the exhaust before the combustion stroke occurs. This unburned oxygen makes its way into the exhaust and can alter the chemistry of exhaust gas aftertreatment catalysts. In particular, increased oxygen lessens catalyst reducing ability thus decreasing the reduction of nitrogen oxides ($NO_x$) prior to venting exhaust gases to the atmosphere. Furthermore, traditional scavenging relies on a pressure decrease from intake manifold to exhaust manifold in order to drive scavenging air flow through the cylinder. Under some operating conditions, this pressure differential is not present, decreasing the window of opportunity for exhaust scavenging.

The present disclosure describes a system and method for injection of a scavenging fluid, such as water or windshield washer fluid, directly into the cylinder, or via port injection, for vapor scavenging which can be achieved without excess oxygen to the exhaust system. The injected liquid evaporates quickly in the high temperature residual exhaust gas and/or when droplets impinge on hot metal surfaces in the combustion chamber. A relatively small amount of liquid can evaporate into a relatively large volume of vapor, thus displacing the residual exhaust gas and forcing it out the open exhaust valves. The use of vapor for scavenging reduces intake air released through the exhaust valve when compared to traditional scavenging that utilizes air flow across a pressure differential to displace residual exhaust gas. Furthermore, because the present disclosure relies on the expansion of liquid to vapor to displace the residual exhaust gas, vapor scavenging can occur even when intake manifold pressure is lower than exhaust manifold pressure. This method is adaptable to port injection or direct injection and may be compatible with various fuels, including diesel, gasoline, and ethanol as examples.

The disclosure describes a method for an engine comprising, injecting an amount of one of water and windshield washer fluid into a combustion cylinder based on a density and volume of residual exhaust gas. Port injection or direct injection scavenging with water or windshield washer fluid can reduce emissions concerns due to excessive oxygen in the exhaust aftertreatment system. Unlike traditional scavenging, the method of the present disclosure can also be used on engines without tiVCT, and even when intake manifold pressure is lower than exhaust pressure, such as at higher RPM, or at low RPM and medium-high load when knock is a concern. Furthermore, vapor scavenging may reduce the temperature of a combustion cylinder and thus reduce knock.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The present disclosure details injection of a liquid for vapor scavenging. In one embodiment scavenging fluid is direct injected late in the exhaust stroke. In an alternate embodiment, employing port injection, fluid is injected during valve overlap or just before the intake stroke. With port injection into the intake air passage, liquid or vapor is readily taken in through the intake valve where it functions in the same way as directly injected fluid. In both embodiments, liquid is quickly evaporated as it hits hot residual gases or hot surfaces. A small amount of liquid expands as it evaporates and displaces the residual exhaust gas, forcing it past the open exhaust valve or valves. Heat is removed from the hot cylinder both by displacing hot residual exhaust products and through evaporative cooling. In this way, injection of scavenging fluid may also reduce propensity for knock and the method of the present disclosure can be adapted for knock mitigation. Furthermore, the present disclosure can be utilized in an engine with or without variable valve timing and even when intake manifold pressure is lower than exhaust manifold pressure.

Figure 1:
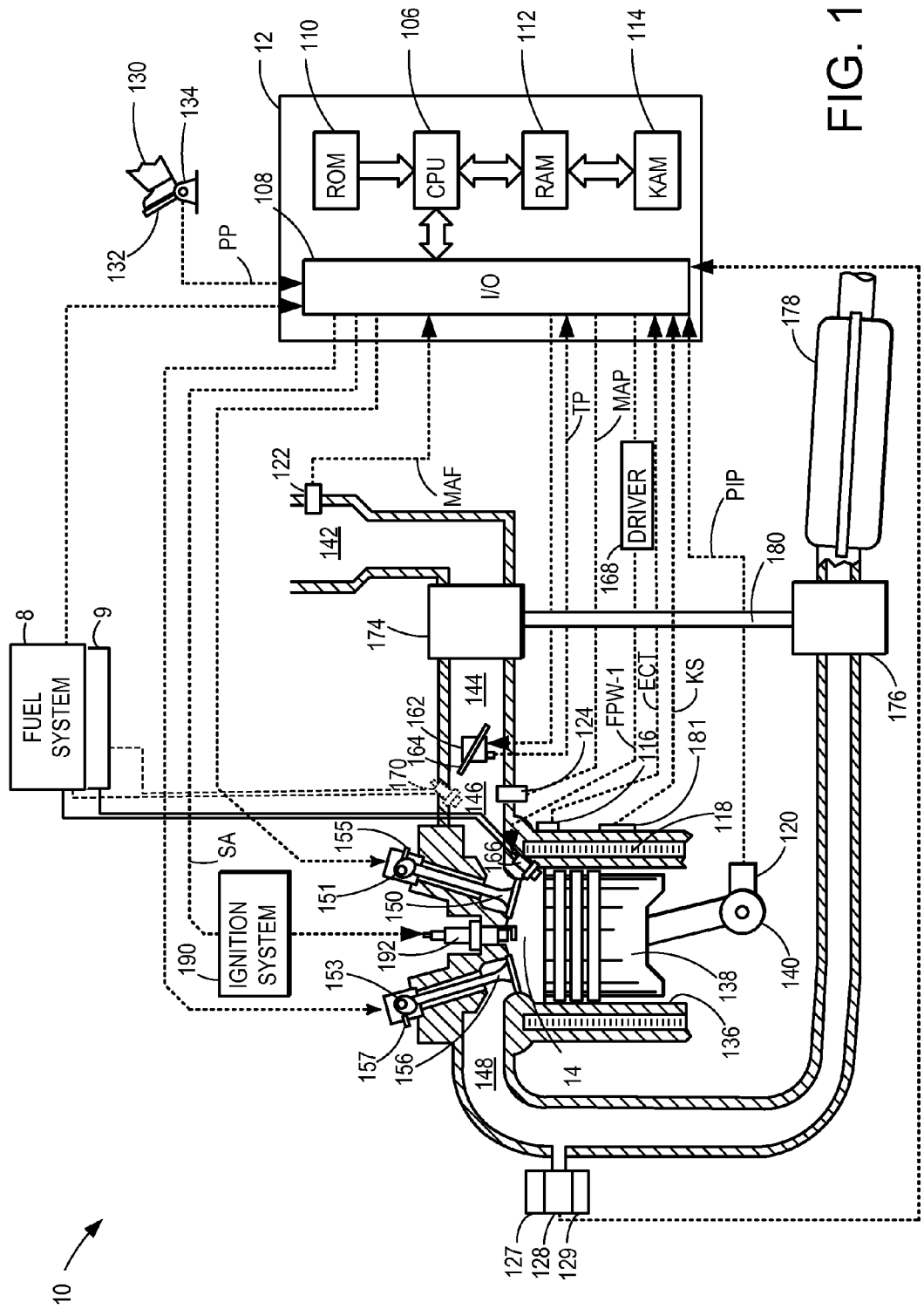
FIG. 1 shows an example cylinder of an internal combustion engine.
Figure 2:
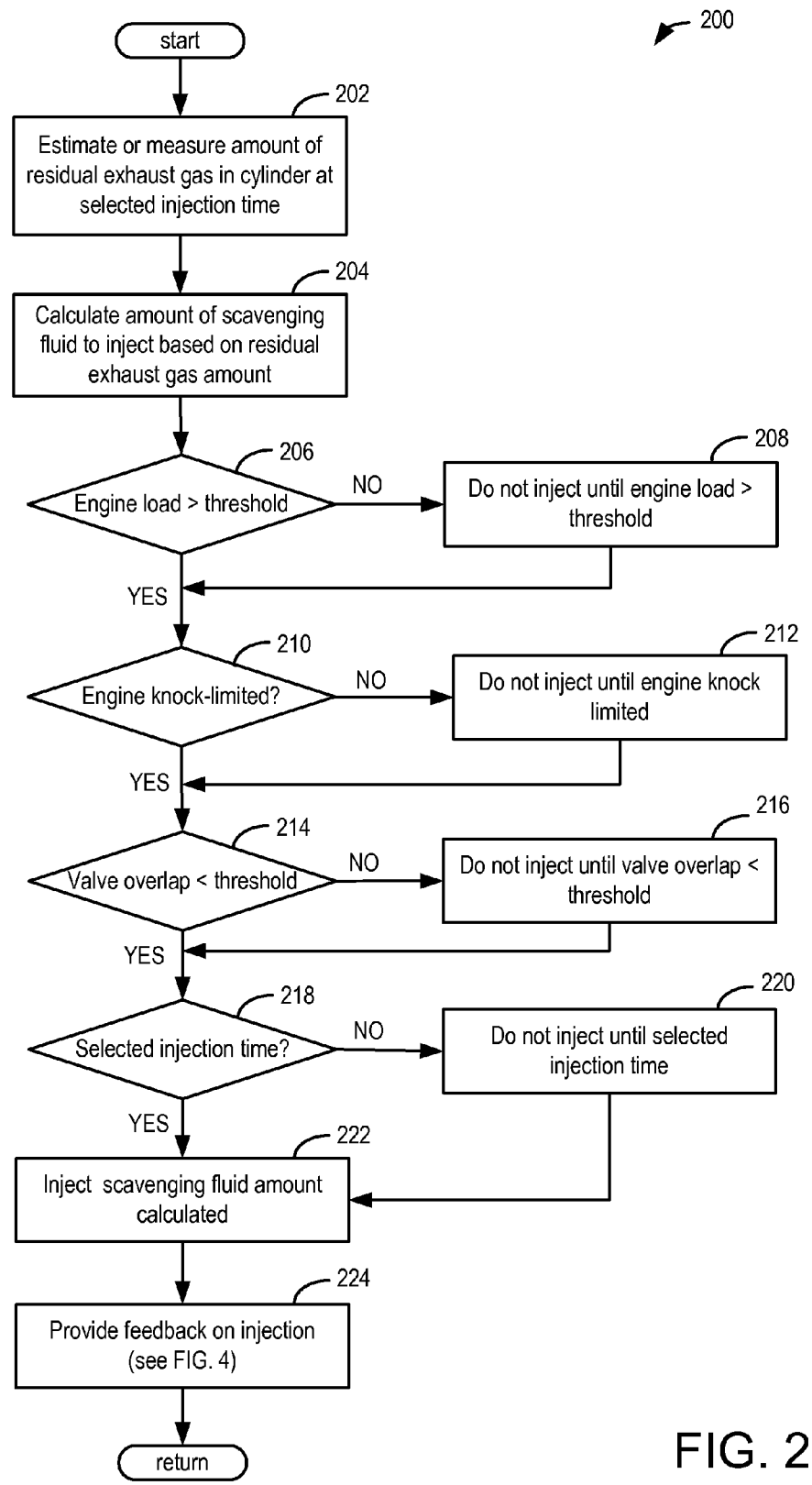
FIG. 2 shows a flow chart depicting a method of injecting scavenging fluid.
Figure 3:
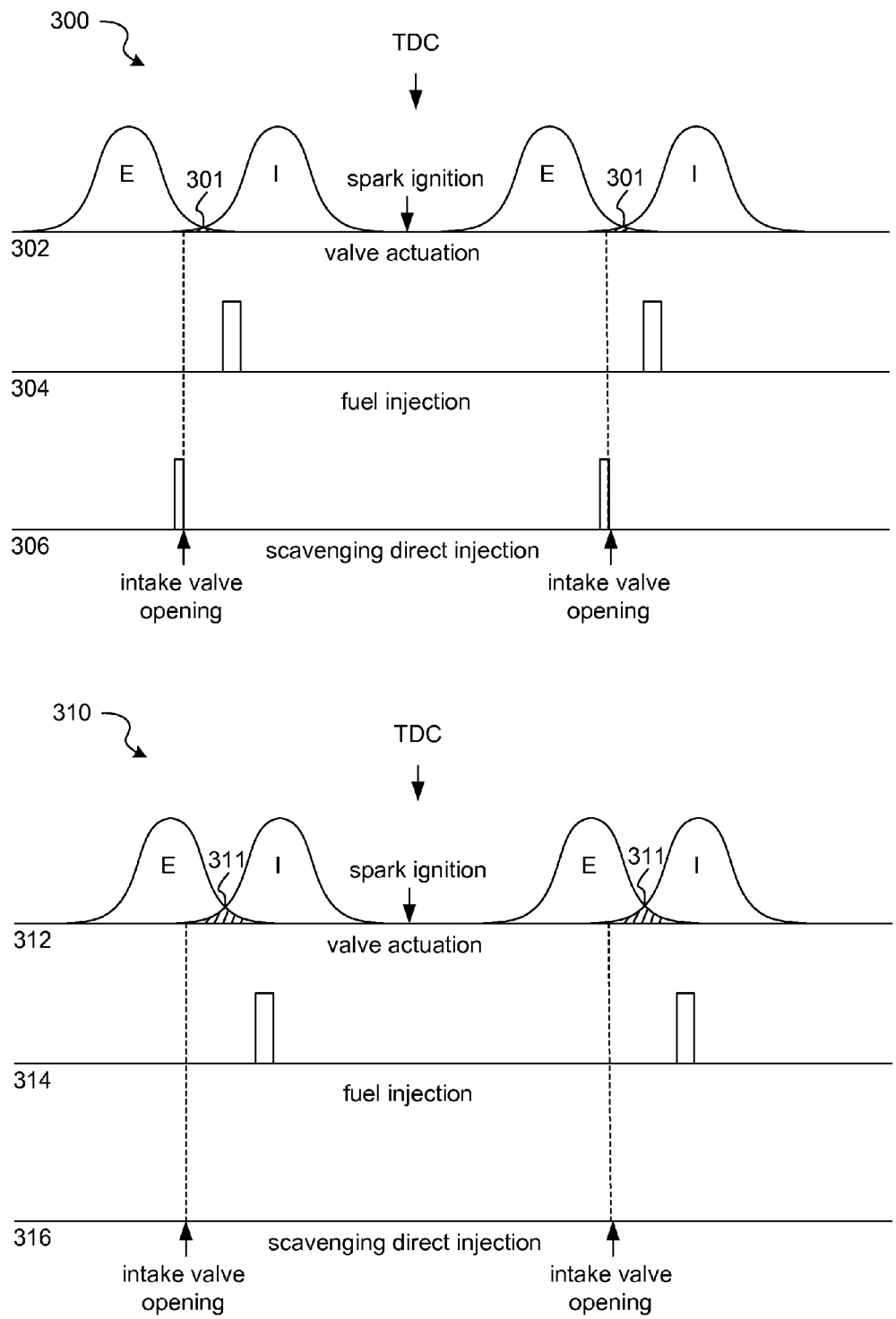
FIG. 3 shows scavenging fluid injection timing for port and direct injection.
Figure 4:
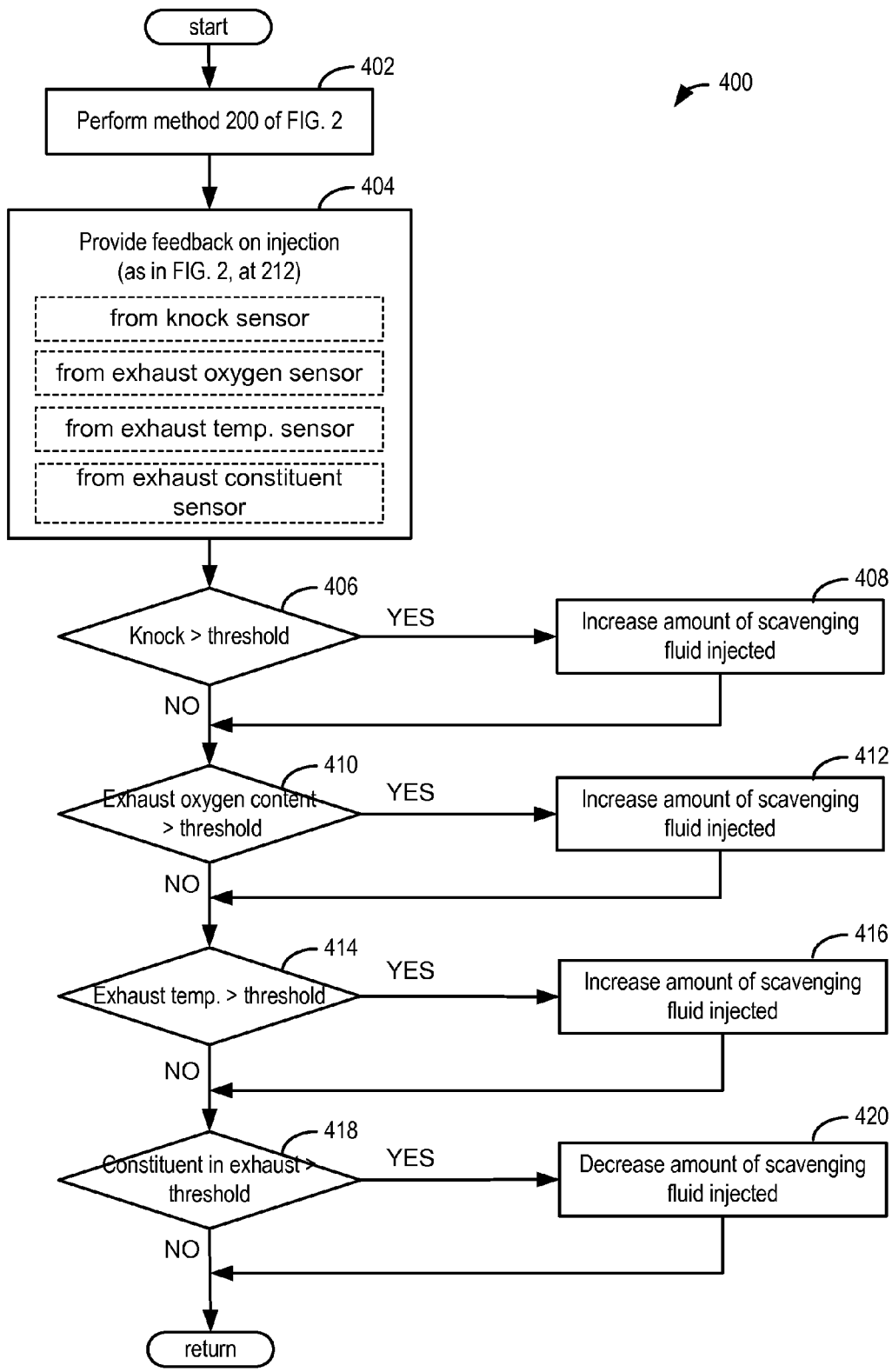
FIG. 4 shows a flowchart depicting adjustments to the amount of scavenging fluid injected.
Figure 5:
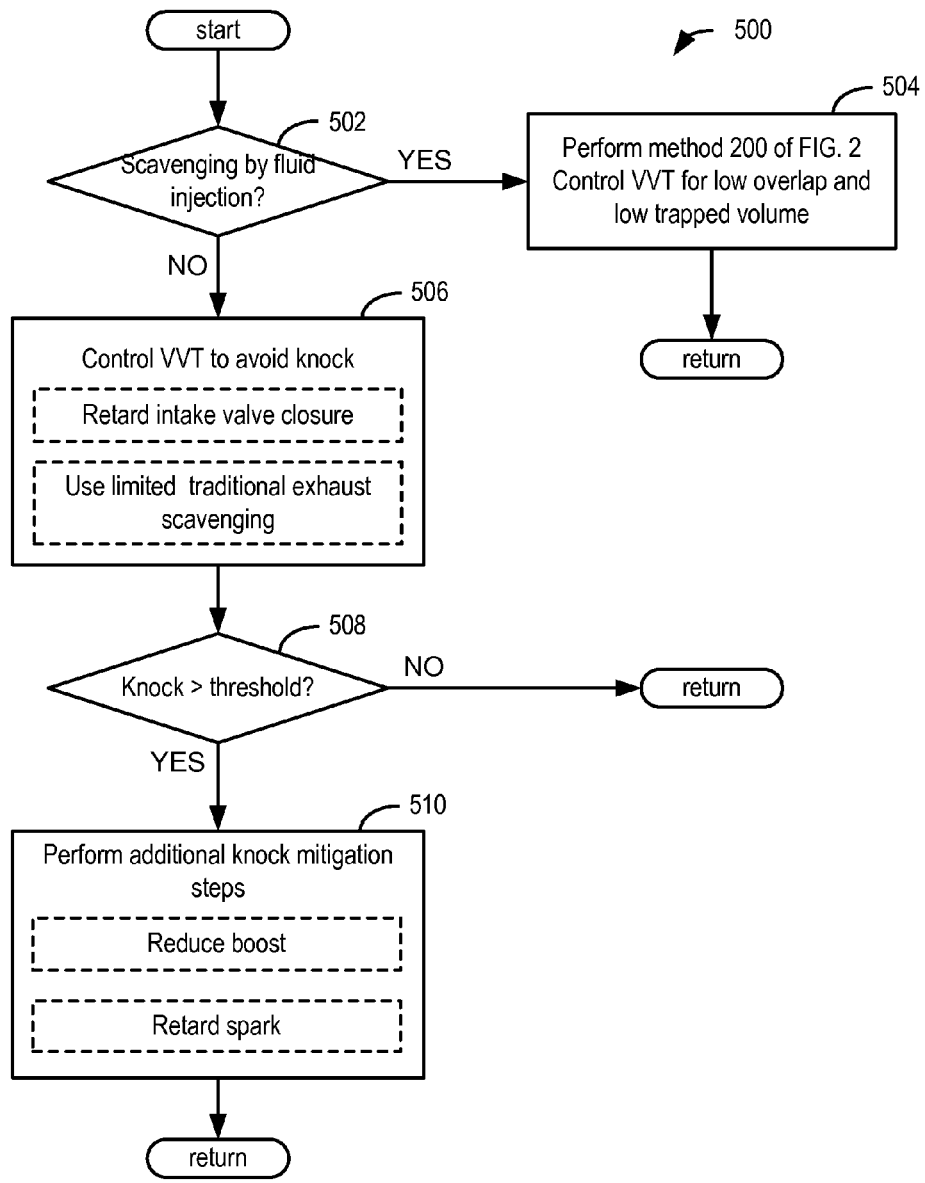
FIG. 5 shows a flowchart depicting an embodiment of the method wherein the engine is equipped with variable valve timing.

The system and method of the present disclosure are described below in reference to the figures. FIG. 1 shows an example cylinder of an engine in accordance with the present disclosure. FIG. 2 details a method of the present disclosure in the form of a flow chart. FIG. 3 diagrams injection timing. FIG. 4 depicts adjustment of a quantity of scavenging fluid injected in response to various feedback from engine sensors. FIG. 5 diagrams a method in accordance with the present disclosure as it pertains to an engine equipped with variable valve timing.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust temperature sensor 129 and exhaust constituent sensor 127 off exhaust passage 148 upstream of emission control device 178. In an alternate embodiment, these sensors may not be located adjacent to one another and may be dispersed through exhaust passage 148. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Exhaust gas sensor 128, exhaust temperature sensor 129 and exhaust constituent sensor 127 provide input to controller 12 via input/output ports 108.

Exhaust temperature may be measured by one or more temperature sensors such as exhaust temperature sensor 129 located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize some form of variable valve timing (VVT) such as one or more of cam profile switching (CPS), variable cam timing (VCT), such as twin independent variable cam timing (tiVCT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a scavenging fluid thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector 170, indicated as a variation in dotted line, providing fuel into the intake port upstream of cylinder 14. Both direct injector 166 and the variation, port injector 170, could be configured to also inject a scavenging fluid such as water or windshield washer fluid from scavenging fluid reservoir 9. In the case of port injection of scavenging fluid a spray of the injection fluid is aimed at a valve, in the direction of the cylinder such that when the intake valve opens spray is aimed past the open valve, at least partially into the cylinder. Alternatively a scavenging fluid injection device may be spaced apart from the fuel injector and arranged to either directly inject or port inject a scavenging fluid.

Fuel may be delivered by the injector to the cylinder during a single cycle of the cylinder. Further, the distribution and/or relative amount of fuel or scavenging fluid delivered from the injector may vary with operating conditions, such as air-charge temperature, or residual exhaust gas volume and density, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows one cylinder of a multi-cylinder engine. As such each cylinder may similarly include its own set of intake/exhaust valves, fuel injector(s), scavenging fluid injection device, spark plug, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold absolute pressure signal (MAP) from sensor 124; and knock signal (KS) from knock sensor 181. Knock sensor 181 may alternatively be located on the cylinder head or may be a sensor to detect vibrations from knock in crankshaft 140. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

FIG. 2 shows a flowchart depicting a method 200 in accordance with the present disclosure. The method 200 may be carried out by engine controller 12. At 202, the amount of the residual exhaust gas in cylinder 14 is estimated or measured. The amount of residual exhaust gas may be based on estimates of density and volume which may be computed by controller 12 based on inputs from MAP sensor 124, temperature sensor 116, exhaust temperature sensor 129, or based on operating conditions such as air-fuel ratio, load, speed, etc. . . . . The temperature and pressure of the residual exhaust gas may be used to calculate the density of residual exhaust gas. The volume of residual exhaust gas may be estimated based on engine operating conditions and other inputs. At 204, the density and volume of residual exhaust gas may be used to calculate the amount of fluid injected. The amount of fluid to be injected will vary with the amount of the residual exhaust gas as the force of gas pressure needed to expel differing amounts of residual exhaust gas from cylinder 14 differs. The amount of fluid injected increases with the amount of residual exhaust gas present in the cylinder. Adjusting the amount of fluid injection based on the calculated amount of residual exhaust gas may limit excessive consumption of scavenging fluid. Furthermore, if the amount of residual exhaust gas is below a threshold, no injection of scavenging fluid may occur. The amount of scavenging fluid injected by port injection can be estimated in substantially the same way.

At 206, it is determined if the engine load is greater than an upper threshold. If the engine load is not greater than an upper threshold (NO at 206) the method proceeds to 208 where no scavenging fluid is injected until the engine load is greater than an upper threshold. If at 206, the engine load is greater than an upper threshold (YES) the method proceeds to 210.

At 210, it is determined if the engine is knock-limited. If at 210, the engine is not knock-limited (NO) the method proceeds to 212 where no injection of scavenging fluid occurs until the engine is knock-limited. If at 210, the engine is knock-limited (YES) the method proceeds to 214.

At 214, it is determined if the extent of valve overlap is below a predetermined threshold. If the extent of valve overlap is not below the predetermined threshold (NO) the method proceeds to 216 where no scavenging fluid is injected until valve overlap is below the threshold. If valve overlap is below threshold (YES at 214), the method proceeds to 218.

Injection of scavenging fluid may occur in the presence of some valve overlap, and in fact port injection of scavenging fluid may occur during valve overlap. Adjustments to variable valve timing may be made to generate some valve overlap below the threshold if injection of scavenging fluid is to be used.

At 218, it is determined if the time is the selected injection time. If it is not the selected injection time (NO at 218) the method proceeds to 220 where there is no injection of scavenging fluid until the time has reached the selected injection time. The selected injection time is determined by the type of injection. If scavenging fluid is direct injected, such as by direct injector 166, the injection of scavenging fluid may occur late in the exhaust stroke. Direct injection of water or windshield washer fluid late in the exhaust stroke cannot be too early, or the amount of residual exhaust gas will be higher and more fluid will be required. Also, it cannot be too late, or the fluid won't have time to completely evaporate and displace residual gas before the intake valves open. For port injection, such as by port injector 170, injection of scavenging fluid may occur during valve overlap, when the intake valve 150 is open very early in the intake stroke, or even when the intake valve 150 is closed just before the intake stroke. The liquid or vapor enters the cylinder 14 through the open intake valve to achieve vapor scavenging in a way similar to that of directly injected fluid. The timing constraints on port injection of water or windshield washer fluid are not as severe. Early injection has little penalty, so a simple control algorithm could be used, for example to keep start of ignition (SOI) or end of ignition (EOI) at or near intake valve opening timing, or a fixed offset from it.

Precise controls may lead to a successful implementation of the method. The injection timing and amount are both controlled to achieve a balance between sufficient scavenging and excess consumption of scavenging fluid.

If at 218, the time is the selected injection timing (YES) the method proceeds to 222 where scavenging fluid is injected either directly into the cylinder 14 or port injected into the intake air passage 146. The method then proceeds to 224 where feedback is provided to controller 12 regarding the injection of scavenging fluid. Method 400 of FIG. 4 provides detail on feedback provided to engine controller 12 based on the injection and subsequent adjustment of future injection fluid amount. Additionally, feedback on temperature and pressure as estimated or measured by MAP sensor 124 or temperature sensor 116, may also be provided and utilized in the adjustment of timing of the injection or to indicate if scavenging fluid has run out or scavenging injection has otherwise failed. After feedback on the injection of fluid is provided to engine controller 12 at 224 the method 200 then returns.

FIG. 3 illustrates the timing of scavenging fluid injection by direct injection. At 300, valve overlap 301 is below a threshold and injection of scavenging fluid occurs. This is in contrast to 310 where valve overlap 311 is not below a threshold and no injection of scavenging fluid occurs. At 302, exhaust and intake valve opening with low overlap 301 are indicated for two combustion cycles. At 304, fuel injection is timed early in the intake stroke following exhaust valve closure. Injection of scavenging fluid, be it water or windshield washer fluid, is seen at 306. Scavenging fluid injection is timed in the second half of the exhaust stroke prior to intake valve opening for direct injection of scavenging fluid. Scavenging fluid injection may occur in the second half of the exhaust stroke after combustion is more than 90% completed. This timing, immediately prior to intake valve opening, may also be effective for port injection of scavenging fluid. Port injection of scavenging fluid may also occur during valve overlap.

Indicated generally at 310 is the converse situation where scavenging fluid is not injected because valve overlap is not below a threshold. Opening of the exhaust and intake valves with valve overlap 311 not below a threshold is seen at 312. At 314, the injection of fuel is shown early in the intake stroke after the exhaust valve has closed. No injection of scavenging fluid is shown at 316 as valve overlap is not below a threshold.

FIG. 4 details a method for adjusting the amount of scavenging fluid injected based on feedback from a prior injection of scavenging fluid. The method 400 starts at 402 where the method 200 of FIG. 2 is performed. At 404 the last step, 212, of method 200 is elaborated on. Feedback is provided to engine controller 12 based on the prior scavenging fluid injection. This feedback may include input from a knock sensor 181, exhaust oxygen sensor such as exhaust gas sensor 128, exhaust temperature sensor 129, or exhaust constituent sensor 127. In some embodiments all of these sensors may not be present, and feedback may be provided from existing sensors or based on estimations by engine controller 12 based on engine operating conditions.

If at 406, knock in excess of threshold is detected by knock sensor 181 (YES), the amount of scavenging fluid in the following injection is increased at 408 in order to further scavenge and cool the cylinder and help prevent knock. If NO at 406, the method proceeds to 410 where it is determined if exhaust oxygen content is higher than threshold as detected by exhaust oxygen sensor 128. If the exhaust temperature is higher than threshold at 410 (YES) the amount of fluid injected in the following injection is increased at 412 to further scavenge the combustion chamber, thus avoiding excess oxygen in the catalyst and reducing $NO_x$ emissions.

If at 410, the exhaust oxygen content is not above the threshold, the method 400 proceeds to 414 where it is determined if the exhaust temperature is above a threshold. If the exhaust temperature is above a threshold (YES) the amount of scavenging fluid in the following injection is increased at 416 to further scavenge and cool the cylinder and ultimately cool exhaust products.

If at 414, the exhaust temperature is not above a threshold the method proceeds to 418 where it is determined if a constituent in the exhaust is above a threshold. An exhaust constituent sensor such as constituentsensor 127 may be utilized to indicate if excessive scavenging fluid or its vapor components is present in the exhaust. The exhaust constituent sensor could, for example, detect water vapor, methanol vapor, or some other component of the scavenging fluid. If the constituent level is above a threshold at 418 (YES) the amount of fluid injected in the following scavenging fluid injection is decreased at 420 to avoid excessive consumption of scavenging fluid. The method 400 then returns.

It should be understood that though listed sequentially the steps 406, 410, 414 and 420 may occur in a varied order or simultaneously. In addition, adjustments to the amount of scavenging fluid injected may be additive. For example, if at 414 exhaust temperature is above a threshold and at 406, knock is above a threshold the increase to the amount of fluid injected may be greater than if either high exhaust temperature or knock was detected on its own. Also, though simplistically described as a single threshold here, each detection may have multiple thresholds corresponding to differing magnitude adjustment to the amount of fluid injected. Furthermore, additional sensors, not listed above may be present and used to provide feedback in order to control injection amount or timing for vapor scavenging. In addition to feedback from specific sensors, adjustments to the injection may be made on estimates of exhaust properties based on engine operating conditions such as MAP, engine speed, air-fuel ratio, etc.

Exhaust scavenging by a method of the present disclosure can increase torque by allowing for spark advance by virtue of a decreased cylinder temperature or by clearing the combustion chamber of exhaust residuals allowing more room for fresh air-fuel mixture. Furthermore, injection of scavenging fluid can prevent or mitigate knock and/or pre-ignition. Precise control of the quantity of fluid injected in response to the abovementioned feedback confers various advantages to a method in accordance with the present disclosure. Injection timing may be timed with valve overlap, injecting at the right time and with valve overlap below a threshold may ensure success of scavenging fluid injection, diminishing emissions and increasing positive effects of exhaust scavenging by a method of the present disclosure. Further, controlling the amount of fluid injected responsive to various feedback may ensure that exhaust scavenging is effective while minimizing the amount of fluid needed, preserving fluid for future injection and preventing build up of scavenging liquid or vapor in a cylinder, oil sump, or exhaust system.

In reference to FIG. 5, an embodiment of a method 500 for controlling injection of scavenging fluid in an engine equipped with variable valve timing (VVT) is described. The engine 10, of FIG. 1, may be compatible with the method 500 if cam actuation systems 151 and 153 include, for example, twin independent variable camshaft timing (tiVCT) and/or cam profile switching (CPS) and/or variable valve lift (VVL). In the method 500 valve timing may be coordinated with injection of scavenging fluid. At 502 it is assessed if scavenging by fluid injection is occurring. If YES at 502, injection of scavenging fluid is carried out according to the method 200 of FIG. 2 with the additional coordination of VVT at 504. Coordination of VVT with scavenging injection includes controlling valve timing for low overlap and low trapped volume (e.g. exhaust valve closure near top dead center). If scavenging by fluid injection is not occurring (NO at 502) the method then proceeds to 506. Injection by scavenging fluid might not occur in situations of a system error or if it is detected that the fluid level reservoir 9 containing one of water and windshield washer fluid is below a threshold level. At 506, in the absence of scavenging by fluid injection VVT is controlled to avoid knock. This may include retarding intake valve closure and/or limited use of traditional exhaust scavenging which uses positive pressure from the intake manifold to blow residual exhaust gases through the exhaust valve opening. At 508, it is assessed if knock avoidance was successful by determining if knock is greater than a threshold value. This may be determined by knock sensor 181. If knock is not greater than threshold (NO at 508) the method then returns. If knock is greater than threshold (YES at 508) additional knock mitigation steps are performed at 510. These may include reducing boost in a boosted engine, and/or retarding spark ignition in a spark ignition engine. It should be understood these are merely examples of additional knock mitigation steps and the methods and system of the present disclosure may be carried out in non-boosted engines, and/or engines without spark ignition. Furthermore an engine without VVT may use spark retard or reduced boost to mitigate knock if scavenging fluid injection errs or is insufficient to prevent knock. Furthermore, though the method 500 describes a method specific to an embodiment in which the engine is equipped with VVT, it should be understood that VVT is not necessary for vapor scavenging and an advantage of the present disclosure is its adaptability to engines with or without VVT.

The present disclosure describes a method, comprising: boosting engine intake air to a cylinder; and injecting an amount of one of water and windshield washer fluid into the cylinder based on an amount of residual exhaust gas. The water or windshield washer fluid evaporate on contact with the hot exhaust gases and hot metal components and the expanded volume of the vapor displaces the residual exhaust gas. The method is adaptable to direct or port injection and can be used with or without variable cam timing and even when intake manifold pressure is higher than exhaust manifold pressure.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   boosting engine intake air to a cylinder; and
   injecting an amount of a scavenging fluid into the cylinder based on an amount of cylinder residual exhaust gas.

2. The method of claim 1, wherein the scavenging fluid is one of water and windshield washer fluid.

3. The method of claim 2, wherein injecting the amount of one of water and windshield washer fluid into the cylinder is via a direct injector.

4. The method of claim 2, wherein injecting the amount of one of water and windshield washer fluid, further comprises injecting the amount of one of water and windshield washer fluid in a second half of an exhaust stroke.

5. The method of claim 2, wherein injecting the amount of one of water and windshield washer fluid into the cylinder is via a port injector.

6. The method of claim 5, wherein injecting the amount of one of water and windshield washer fluid, further comprises injecting the amount of one of water and windshield washer fluid during valve overlap, an injection spray is aimed past an open valve at least partially into the cylinder.

7. The method of claim 5, wherein injecting the amount of one of water and windshield washer fluid, further comprises injecting the amount of one of water and windshield washer fluid at an end of an exhaust stroke immediately prior to an intake stroke and intake valve opening.

8. The method of claim 2, wherein water is injected via a direct injector in a second half of an exhaust stroke after combustion is more than 90% completed, the injected water vaporizing in the cylinder and pushing additional cylinder residual exhaust gas past an open exhaust valve, the water injected responsive to the amount of residual exhaust gas being greater than a threshold, and an extent of valve overlap of an intake and an exhaust valve being below a threshold.

9. The method of claim 2, wherein the amount of one of water and windshield washer fluid is increased responsive to an increased amount of residual exhaust gas, and further increased responsive to knock.

10. A method, comprising:
    if valve overlap is below a threshold, injecting an amount of one of water and windshield washer fluid into a cylinder during an exhaust stroke to increase scavenging; and
    if valve overlap is above a threshold, not injecting one of water and windshield washer fluid into the cylinder during the exhaust stroke.

11. The method of claim 10, further comprising, boosting engine intake air to the cylinder above exhaust pressure with valve overlap below the threshold, and adjusting variable valve timing to generate at least some valve overlap below the threshold.

12. The method of claim 10, further comprising, wherein an engine carries out combustion of a fuel other than one of water and windshield washer fluid in a cylinder cycle of the exhaust stroke, where said scavenging is performed at engine loads above an upper threshold where the engine is knock-limited 13. The method of claim 12, further comprising, adjusting variable valve timing to retard intake valve closure when a fluid level in a reservoir containing one of water and windshield washer fluid is below a threshold and knock is detected.

14. The method of claim 11, further comprising, reducing the boosting of engine intake air when the fluid level in the reservoir containing one of water and windshield washer fluid is below the threshold and knock is detected.

15. The method of claim 11, further comprising, retarding spark ignition when the fluid level in the reservoir containing one of water and windshield washer fluid is below the threshold and knock is detected.

16. The method of claim 11, further comprising, adjusting the amount of one of water and windshield washer injected into the cylinder based on an amount of residual exhaust gas.

17. An engine method, comprising:
injecting an amount of fluid into a cylinder, the amount based on density and volume of residual exhaust gas in the cylinder, the fluid comprising water; and
adjusting the amount based on feedback from an engine sensor.

18. The method of claim 17, wherein the engine sensor is a knock sensor and adjusting the amount of fluid based on feedback from the engine sensor further comprises increasing the amount of fluid injected responsive to knock.

19. The method of claim 17, wherein the engine sensor is an exhaust gas oxygen sensor and adjusting the amount of fluid based on feedback from the engine sensor further comprises increasing the amount of fluid injected responsive to excess oxygen.

20. The method of claim 17, wherein the engine sensor is an exhaust temperature sensor and adjusting the amount of fluid based on feedback from the engine sensor further comprises increasing the amount of fluid injected responsive to high temperature.

21. The method of claim 17, wherein the engine sensor is an exhaust constituent sensor and adjusting the amount of fluid based on feedback from the engine sensor further comprises decreasing the amount of fluid injected responsive to constituent in an exhaust flow.

\* \* \* \* \*